INVENTOR
Hugh K. Schilling
BY Robert M. Dunning
ATTORNEY

March 12, 1957  H. K. SCHILLING  2,784,606
SECTIONAL PULLEY

Filed Oct. 29, 1952  4 Sheets-Sheet 3

INVENTOR
Hugh K. Schilling
BY Robert M. Dunning
ATTORNEY

March 12, 1957     H. K. SCHILLING     2,784,606
SECTIONAL PULLEY

Filed Oct. 29, 1952                          4 Sheets-Sheet 4

INVENTOR
Hugh K. Schilling
BY Robert M. Dunning
ATTORNEY

United States Patent Office 2,784,606
Patented Mar. 12, 1957

2,784,606

SECTIONAL PULLEY

Hugh K. Schilling, Minneapolis, Minn., assignor to Horton Manufacturing Co., Inc., Minneapolis, Minn., a corporation of Minnesota Application October 29, 1952, Serial No. 317,383

5 Claims. (Cl. 74—230.3)

This invention relates to an improvement in sectional pulley and deals particularly with a pulley structure which may be built up into various widths.

Pulleys vary considerably in diameter and also in width. The width of the pulley depends upon the power which the pulley must transmit. For example if the pulley is to drive a series of V-belts, the number of belts and belt grooves depends upon the amount of power which must be transmitted. For this reason a great number of pulley sizes must be stocked in order to provide all of the necessary pulley sizes demanded by the trade.

A feature of the present invention resides in the provision of a pulley which is made up for the most part of identical pulley sections. By securing these sections together, a pulley is produced which may be of any desired width and which may include the proper number of belt grooves. As a result the number of pulleys which must be kept in stock by any pulley supply firm may be greatly reduced.

A feature of the present invention lies in the fact that a pulley of any desired width may be produced by providing one or more hub sections and one or more rim sections which may be connected to the hub section or sections. Thus in maintaining a supply of pulleys it is only necessary to keep on hand hub sections and rim sections of each diameter which might be required. The pulley of proper width may then be constructed from the sections on hand, thus avoiding the necessity of providing pulleys of numerous widths as well as numerous diameters.

A further feature of this invention resides in the provision of a construction in which the hub section may be located at any position relative to the rim sections. Thus if a pulley is required having the belt grooves overhanding the hub, such a pulley can be assembled. Similarly the belt grooves may lie entirely inwardly of the hub sections if preferred. The necessity of producing special pulleys to order may accordingly be in a large measure eliminated.

A feature of the present invention resides in the manner in which the sections are connected together. Each section is designed to be attached to each other section so that a pulley of any desired width may be produced having one or more hub sections connected thereto and having these hub sections in any desired location.

These and other objects and novel features of the present invention will be more clearly and fully set forth in the following specification and claims.

In the drawings forming a part of the specification:

The pulley is indicated in general by the letter A. In the particular form of construction illustrated the pulley is provided with three sectional rim sections 10, 11 and 12, two hub sections 13 and 14, two outer rim sections 15 and 16 at one end of the pulley, and two outer rim sections 17 and 19 at the other end of the pulley. The rim sections and hub sections have been given different identifying numerals for the purpose of identification. It will be understood, however, that all of the rim sections are identical and both of the hub sections are identical.

Figure 3:
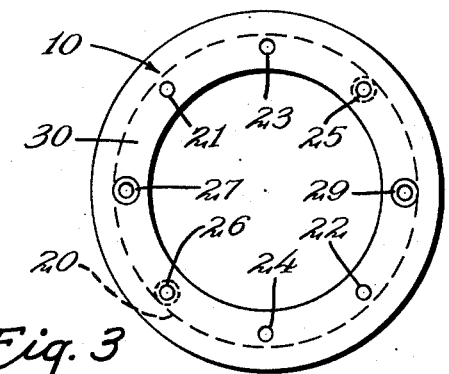
Figure 3 is a plan view of a pulley rim section.
Figure 4:
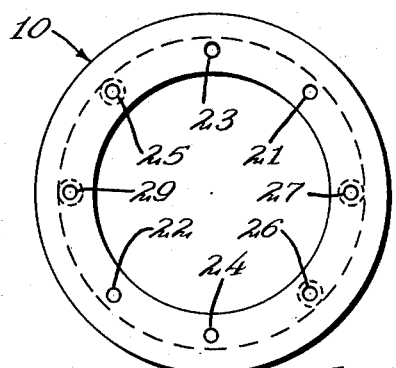
Figure 4 is a view of the pulley rim section showing the surface thereof opposite that shown in Figure 3.

Each rim section is constructed as best illustrated in Figures 3 and 4 of the drawings. The sections such as 10 are ring shaped in form having a peripheral substantially V-shaped groove 20 in the outer surface thereof. With respect to Figure 3, a pair of holes 21 and 22 are arranged in diametrically opposed relationship through the rim sections at equal distance from the center thereof. Two similar pin apertures 23 and 24 extend through each rim section in diametrically opposed relationship, these apertures being at an angle of forty-five degrees in a clockwise direction from the first described apertures 21 and 22 and being arranged with their axes at a similar radius. Two threaded openings 25 and 26 extend through the rim sections in diametrically opposed relationship, these apertures being arranged at a forty-five degree angle in a clockwise direction from the apertures 23 and 24. Two additional diametrically opposed apertures 27 and 29 are provided mid-way between the apertures 21 and 26 and the apertures 22 and 25 respectively. These apertures 27 and 29 are counter-sunk or counter-bored on one surface 30 of the pulley as illustrated in Figure 3.

Figure 5:
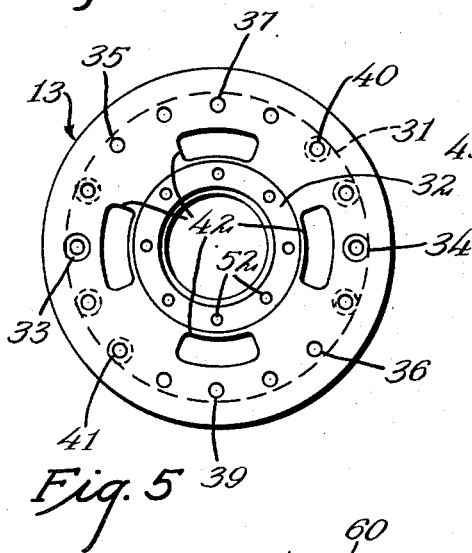
Figure 5 is a view of one side of a pulley hub section.
Figure 6:
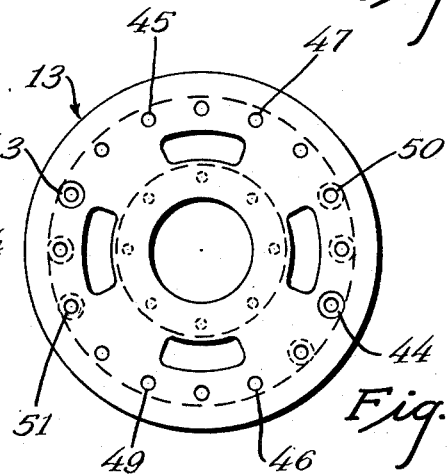
Figure 6 illustrates the opposite side of the hub section.

The hub sections of the pulley are constructed as best illustrated in Figures 5 and 6 of the drawings. These sections differ from the other sections in that they are so arranged that the rim sections may be bolted thereto from either side. Thus the hub sections are provided with two sets of apertures with one set arranged 22½° between the other apertures which are 45° apart.

As shown in Figure 5, the hub section 13 comprises a ring shaped body of similar outside diameter to the rim section 10 and having a substantially V-shaped pulley belt groove 31 in its periphery. The internal diameter of the ring shaped body is somewhat less than that of the rim sections 10 and a hollow tapered hub 32 extends from one side of the pulley.

The pulley 13 includes two diametrically opposed countersunk apertures 33 and 34. Arranged at an angle of 45° from these apertures are two pin apertures 35 and 36. At 45° from the diametrically opposed apertures 35 and 36 is a second pair of similar apertures 37 and 39. A pair of threaded apertures 40 and 41 are arranged at 45° between the counter-sunk apertures 33 and 34 and the apertures 37 and 39. The ring shaped body of the hub sections such as 13 are also provided with angularly spaced apertures 42 extending therethrough, these apertures being mainly for the purpose of reducing the weight of the structure.

The opposite surface of the hub section 13 is illustrated in Figure 6 of the drawings. This side of the pulley also has eight angularly spaced openings extending therethrough and these apertures are arranged intermediate the apertures previously described. This surface of the hub section is provided with two opposed counter-sunk apertures 43 and 44 which are arranged intermediate certain of the previously described apertures. Diametrically opposed pin apertures 45 and 46 are arranged at a forty-five degree angle in a clockwise direction from the apertures 43 and 44. At a ninety degree angle in a clockwise direction from these apertures 43 and 44 are a third set of apertures 47 and 49. A pair of threaded apertures 50 and 51 are between the apertures 43 and 44 and the apertures 47 and 49 respectively.

The hub 32 is provided with a series of angularly spaced apertures in order to accommodate the hub adapters which extend between the cylindrical hubs and the shafts on which the hubs are mounted. The hub adapters are grooved to accommodate a key and it is obviously necessary that the key ways of the two adapters of a pulley be aligned so that the shaft on which the pulley is mounted may be provided with a single key way. Accordingly the end of the hub 32 is provided with eight angularly spaced threaded apertures 52 to accommodate fastening screws for securing the hubs in place.

Figures 7, 8:
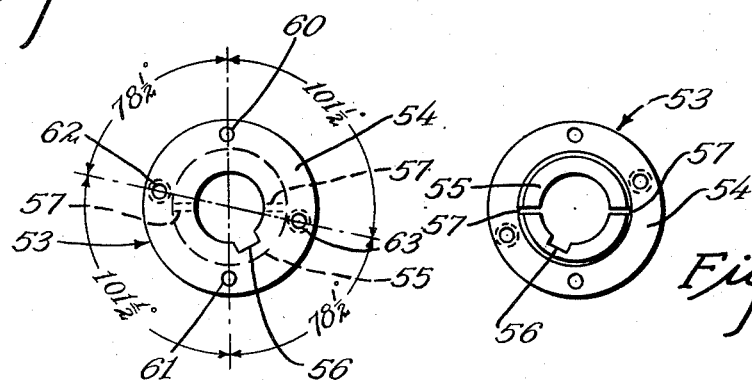
Figure 7 illustrates diagrammatically one side of the hub adapter.
Figure 8 illustrates the opposite side of the hub adapter.

The hub adapters are best illustrated in Figures 7 and 8 of the drawings. These adapters are indicated in general by the numeral 53 and comprise a ring shaped flange 54 having a tapered hub portion 55 coaxial therewith and extending from one surface thereof. An elongated key way groove 56 is provided on the inner surface of the sleeve 55 and the sleeve is longitudinally split as indicated at 57 to fit within the hubs 32. The longitudinal slots 57 permit the hub adapters to be compressed slightly as they are drawn toward the hub so that they will fit tightly about the shaft and will also fit tightly within the hub.

As indicated in the drawings the flange 54 is provided with two diametrically opposed apertures 60 and 61 which are arranged with their axes parallel and parallel to the axis of the adapter. The hub is also provided with a pair of threaded apertures 62 and 63 which are angularly related to the apertures 60 and 61. The angular distance between the threaded apertures 62 or 63 and a corresponding aperture 60 or 61 is seventy-eight and one-half degrees in a clockwise direction while the distance between these threaded apertures 62 or 63 and the other aperture 61 or 62 is one hundred one and one-half degrees in a counter-clockwise direction. In this way the threaded apertures 62 and 63 are always intermediate the apertures 52 of the hub 32 regardless of the angular position thereof.

The apertures 60 and 61 are designed to accommodate bolts or cap screws 64 which extend into two diametrically opposed apertures 52. The other apertures 62 and 63 are designed to accommodate other set screws or cap screws which are designed to bear against the end of the hub 32 for use in removing the adapter from the hub section. In other words, one pair of bolts 64 are designed to draw the adapter toward the hub and the other set of threaded apertures is desiged to accommodate suitable cap screws which may force against the hub 32 to assist in detaching the hub adapter from the hub section.

Figure 1:
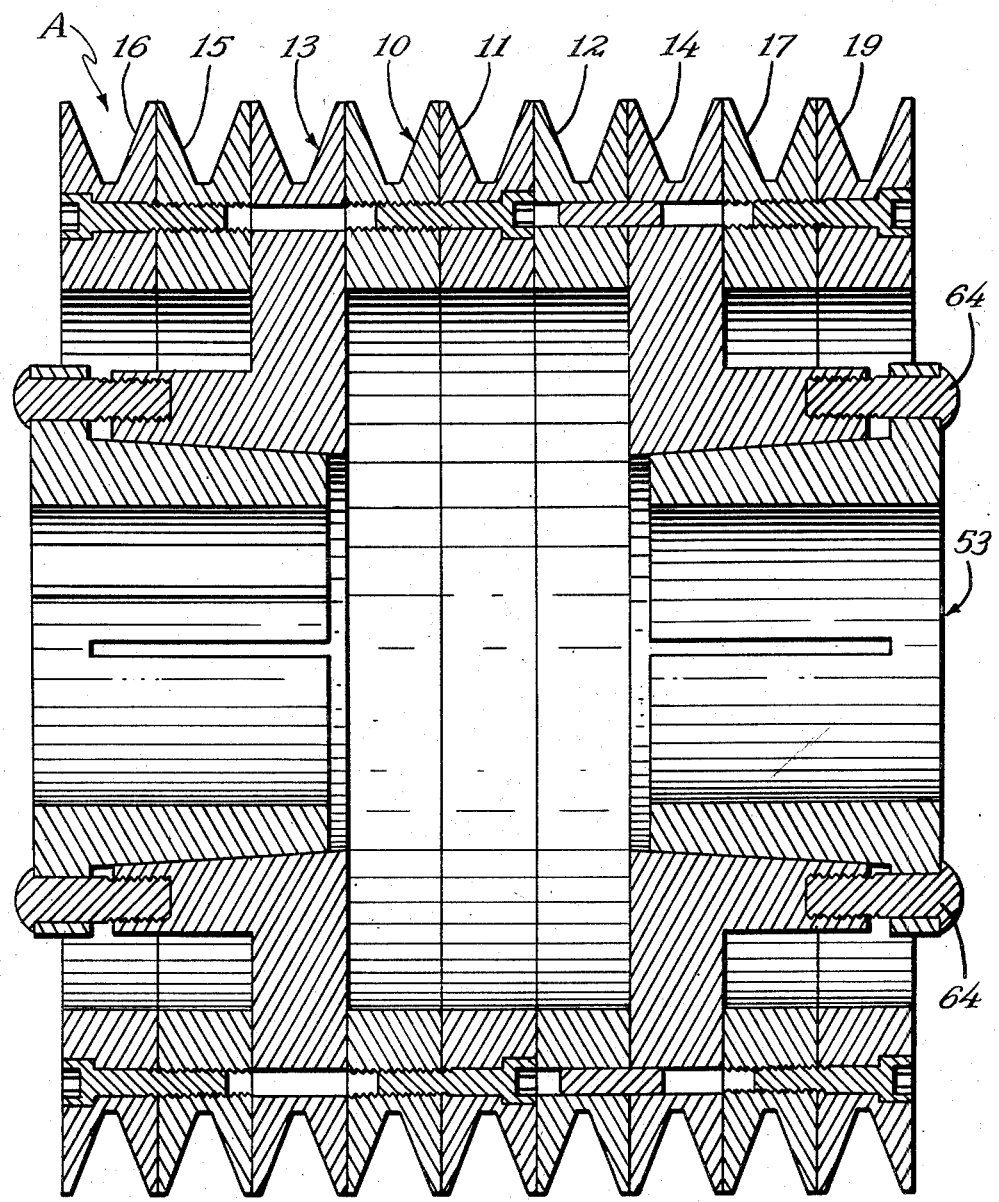
Figure 1 is a sectional view through a pulley showing in general the construction thereof.
Figure 2:
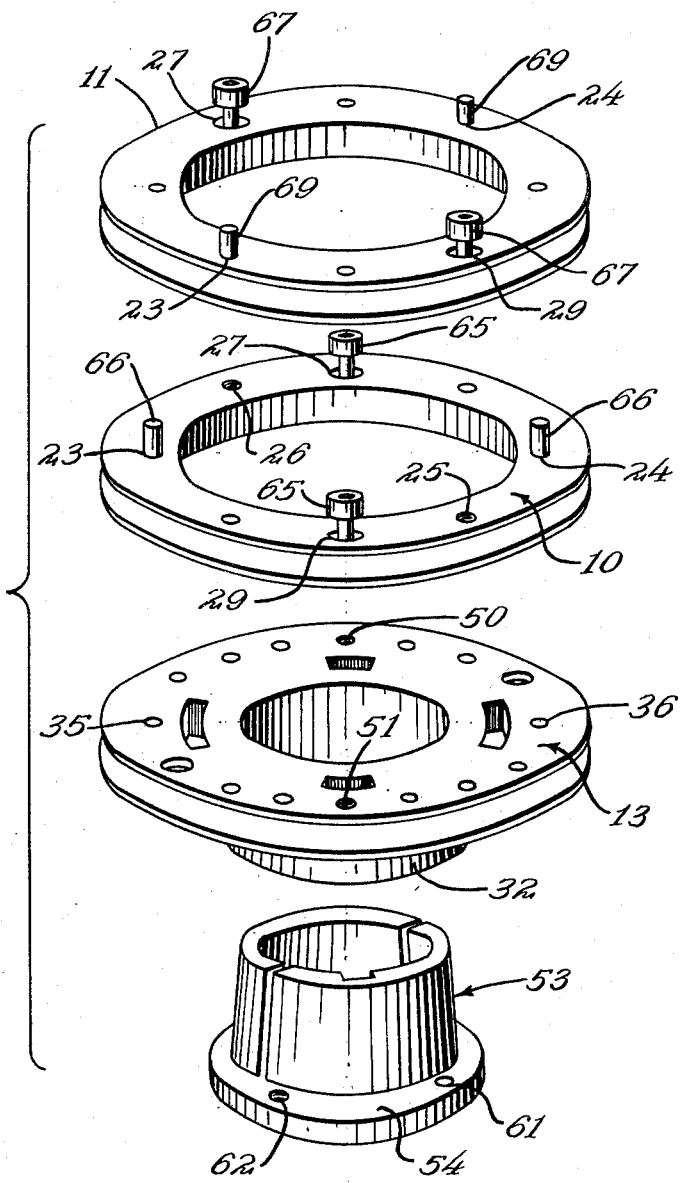
Figure 2 is an exploded view showing a series of pulley parts in readiness for connection and showing the relative positions of the parts.

The manner in which the pulley is assembled is indicated diagrammatically in Figure 2 of the drawings. The hub section 13 is shown in readiness for connection with the hub adapter 53. Bolts (not illustrated) extend through the openings 60 and 61 to draw the flange 54 of the hub adapter into the hub 32 of the hub section 13.

As illustrated, above the hub section 13 a rim section 10 is designed to be bolted to the rim section. Cap screws 65 are designed to extend into the counter-sunk openings 27 and 29 of the rim section 10 and into the threaded openings 50 and 51 of the hub section 13. Pins 66 extend through openings 23 and 24 at right angles to the openings 27 and 29 and into corresponding openings 35 and 36 of the hub section 13. The cap screws 65 are provided with socketed ends designed for engagement with an Allen wrench or the like and the head is counter-sunk into the rim section so that its upper surface will be flush with, or recessed from, the surface of the rim section. The cap screws and the pins 66 combine to hold the rim section 10 from rotation relative to the hub section 13.

A rim section 11 which is identical to the rim section 10 is next secured to the rim section 10. Bolts or cap screws 67 extend through the counter-sunk openings 27 and 29 of the rim section 11 and pins 69 extend through the right angularly arranged apertures 23 and 24 of the rim section. The cap screws 67 are designed to extend into the threaded apertures 25 and 26 of the rim section 10. These elements combine to prevent the rotation of the two rim sections.

It will be noted that the fastening bolts or cap screws are of just sufficient length to secure two adjoining sections together and the pins are also similarly proportioned. As a result the pulley may be made of any desired number of connected sections. Furthermore, the pulley may be assembled by first starting with a pair of outer rim sections 15 and 16 with the hub section bolted thereto, intermediate rim sections bolted to the first hub section, a second hub section bolted to the intermediate rim sections and outer rim sections such as 17 and 19 bolted to the second hub section 14. In other words, all of the sections may be bolted together from one direction or the intermediate portion of the pulley may be assembled and outer rim sections added thereto.

An examination of Figure 2 will indicate that each of the rim sections are arranged at forty-five degrees from the next adjoining section. This has the advantage of permttting the assembly of the pulley by use of short bolts and pins to insure utmost flexibility and also prevents interference of one threaded element with another or of one pin with another. In the final assembly it will be found that the pins connecting two rim sections together are arranged with the pins connecting two sections immediately above the socket of a cap screw connecting the next two adjoining sections. In disconnecting the pulley sections the pins may be driven downwardly until an end extends into the socket of a cap screw so as to entirely disengage the pins from connecting position. The pins fit into the various pin apertures with a drive fit, and thus are not accidentally removable.

In view of the angular relation between adjoining sections and in view further of the fact that the hub sections are provided with attaching apertures twenty-two and one-half degrees apart in angular relation, the hubs 32 of the hub sections are provided with the apertures 52 which are twenty-two and one-half degrees apart. This insures proper alignment of the key ways 56 of the hub section at opposite ends of the pulleys where two hub sections and adapters are employed. Furthermore, the angular relation between the threaded apertures 62 and 63 and the bolt apertures 60 and 61 make it possible for the bolts to press against portions of the hub between the angularly spaced apertures.

From the foregoing description it will be obvious that in stocking pulleys it is only necessary to stock rim sections, hub sections and adapters for various diameters. When a pulley is ordered it is possible to form a pulley of the proper width and provide it with the proper number of belt grooves by merely adding sections together in the manner described. Thus the number of parts which must be maintained in stock to form pulleys of any width or diameter is greatly reduced and the pulleys may be furnished in parts or assembled to order.

Figure 9:
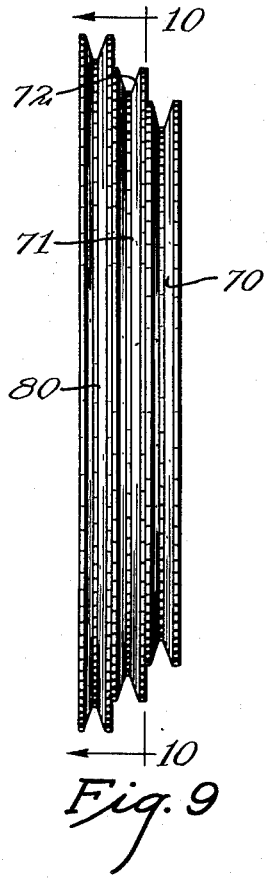
Figure 9 is an elevation view of a modified form of pulley.
Figure 10:
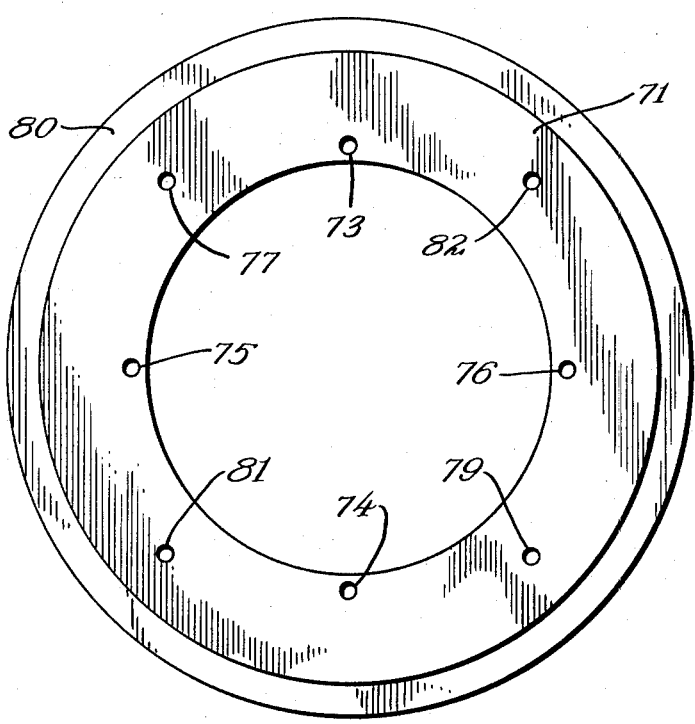
Figure 10 is a sectional view on the line 10—10 of Figure 9.

In Figures 9 and 10 we illustrate a "step-down" pulley in which the grooves are at different diameters. The first section 70 may be identical to the previously described hub sections 13 and 14, and may accommodate a tapered adapter of the type shown in Figures 7 and 8.

As seen in Figure 10, the next section 71 is of greater external diameter, and includes a peripheral pulley groove 72. The ring shaped body includes two diametrically opposed holes 73 and 74, and a pair of right angularly arranged diametrically opposed threaded apertures 75 and 76. The openings 73 and 74 accommodate pins to prevent relative rotation with the hub section 70, and the threaded apertures 75 and 76 are designed to accommodate bolts securing sections 70 and 71 together.

A third pair of opposed openings 77 and 79 are at a greater radius from the axis and may accommodate pins extending into the third section 80. The openings 77 and 79 are preferably at a forty-five degree angle in a counter-clockwise direction from the openings 73 and 74. The fourth set of apertures 81 and 82 are at right angles to the openings 77 and 79 and at equal radius therewith. These last mentioned apertures may be recessed to accommodate the heads of bolts, or cap screws securing the sections 71 and 80 together.

In a similar manner numerous sections may be added, producing pulleys of the stepped type. Hub sections of various diameters may be similarly connected when necessary.

Figure 11:
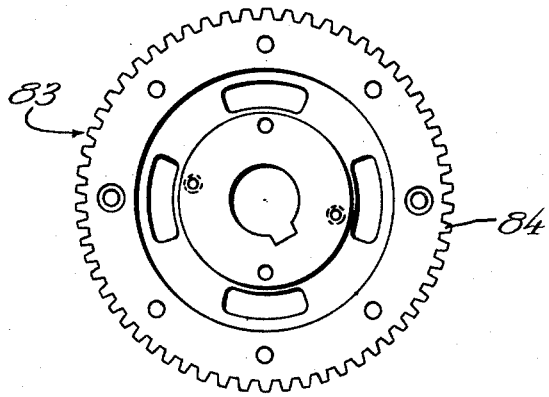
Figure 11 is an end elevation view of a modified structure bearing sprocket teeth instead of belt grooves.

In Figure 11 of the drawings I disclose a structure similar to that illustrated in Figures 1 through 8 of the drawings with one major exception. The hub and rim sections are not provided with pulley grooves. Instead, one or more of the sections of the pulley 83 are provided with relatively narrow peripheral flanges having sprocket teeth 84 thereon. Thus a multiple sprocket, or combination pulley and sprocket may be readily produced.

In accordance with the patent statutes, I have described the principles of construction and operation of my sectional pulley and while it has been endeavored to set forth the best embodiment thereof, it is desired to have it understood that obvious changes may be made within the scope of the following claims without departing from the spirit of the invention.

I claim:

1. A sectional pulley including a hub section and a series of rim sections attached thereto, each rim section including a series of angularly equally spaced apertures having axes parallel to the axis of the rim section, two diametrically opposed of said apertures being internally threaded and two diametrically opposed of said apertures being counter-sunk apertures, and bolts in the counter-sunk apertures of one rim section extending into the threaded apertures of an adjacent rim section, said hub section including two series of angularly equally spaced apertures extending through the hub section from opposite sides thereof, the apertures of each series having axes parallel to the axis of the hub section and being similar in number to the apertures of said rim sections, the apertures of one series in said hub section being angularly spaced to the apertures of the other series, whereby any two adjacent sections may be selectively connected together by bolts passing through the hub section and into a rim section from either side thereof.

2. The structure described in claim 1 and including a third series of circularly arranged equally spaced apertures in said hub section, a hub adapter having a pair of diametrically opposed apertures therein at a radius from the hub adapter axis equal to the radius from said axis to the apertures of said third series, bolts in said last mentioned diametrically opposed apertures and in two of said apertures of said third series connecting said hub adapter to said hub section, and bolts extending through said hub adapter and engaging said hub section between the apertures of said hub section.

3. The structure of claim 1 and in which the series of angularly spaced apertures each include eight apertures, four of which are pin apertures, and including friction pins in certain of said pin apertures, said pins extending into the pin apertures of two adjoining sections.

4. A sectional pulley including a hub section and a series of rim sections assembled thereto, each rim section having eight equally spaced apertures therethrough equally spaced from the axis of the rim section, two diametrically opposed of said apertures being counter-sunk and two diametrically opposed of said apertures at forty-five degrees from said counter-sunk apertures being internally threaded, the remaining four apertures comprising pin apertures, said hub section including two series of equally spaced apertures extending therethrough from opposite sides thereof, each series including two diametrically opposed counter-sunk apertures, two diametrically opposed apertures at forty-five degrees from said counter-sunk apertures being internally threaded, and the remaining four apertures comprising pin apertures, bolts in the countersunk apertures of each but the last of the assembled sections extending into the threaded apertures of the next section, and pins in certain of the pin apertures of each section extending into registering pin apertures of the next adjoining section, the pins connecting each pair of adjoining sections being at ninety degrees from the bolts connecting the same sections.

5. A sectional pulley including at least one hub section and at least one rim section in assembled side by side relation, the sections having equally angularly spaced apertures therethrough, the apertures being at equal radius from the axis of the sections, the apertures being in registry in the various sections, each section including a series of eight such apertures, two said apertures being diametrically opposed counter-sunk apertures extending thereinto from one surface thereof, two adjoining of said apertures being internally threaded diametrically opposed apertures and four of said apertures being pin apertures, each rim section on one side of said hub section having their counter-sunk surfaces in parallel spaced relation, bolts in said counter-sunk apertures of all but one of said sections extending into the threaded apertures of the next adjoining section, pins in certain of the pin apertures of each section extending partially into the pin apertures of the adjoining section, the said certain pin apertures being at ninety degrees from the bolts connecting these adjoining sections, said hub sections having a second series of apertures extending therethrough similarly spaced and arranged as the first series but being between the apertures of the first series, the counter-sunk apertures of the second series extending into the hub section from the surface thereof opposite said one surface, whereby the bolts connecting the assembled sections may extend through said hub section from either and both sides thereof.

References Cited in the file of this patent

UNITED STATES PATENTS

| | | |
|---|---|---|
| 464,795 | Dodge | Dec. 8, 1891 |
| 588,577 | Humphreys | Aug. 24, 1897 |
| 1,266,579 | Garcelon | May 21, 1918 |
| 1,371,212 | Adams et al. | Mar. 15, 1921 |
| 1,395,913 | Ford | Nov. 1, 1921 |
| 1,831,833 | Wright | Nov. 17, 1931 |
| 2,427,172 | Williams | Sept. 9, 1947 |
| 2,500,515 | Browning | Mar. 14, 1950 |
| 2,610,515 | Williams | Sept. 16, 1952 |